United States Patent

[11] 3,528,340

| [72] | Inventor | Paul M. Lowy |
| | | Pittsburgh, Pennsylvania |
| [21] | Appl. No. | 756,023 |
| [22] | Filed | Aug. 28, 1968 |
| [45] | Patented | Sept. 15, 1970 |
| [73] | Assignee | Mesta Machine Company |
| | | Pittsburgh, Pennsylvania |
| | | a corporation of Pennsylvania |

[54] CONTROL ARRANGEMENT FOR FLASH WELDER AND THE LIKE
10 Claims, 3 Drawing Figs.

| [52] | U.S. Cl. | 91/37 |
| [51] | Int. Cl. | F15b 21/02 |
| [50] | Field of Search | 91/37, 35 (Cursory); 92/12; 60/97 (Cursory) |

[56] References Cited
UNITED STATES PATENTS

| 2,435,026 | 1/1948 | Barnes | 91/37X |
| 2,688,066 | 8/1954 | Doutt | 91/37X |
| 3,081,060 | 3/1963 | Thomas | 91/37X |
| 3,104,591 | 9/1963 | Cudnohufsky | 91/37X |
| 3,440,932 | 4/1969 | Gutnikov et al. | 91/38UX |

Primary Examiner—Everette A. Powell, Jr.
Attorney—Buell, Blenko and Ziesenheim

ABSTRACT: I disclose hydraulic apparatus for controlling the relative movement of the platens of welding machines or the like. The apparatus is particularly adapted for use with flash butt-welding machines. Through the use of a single integrated valve and associated controls, I provide a single control means by which platen motions suitable for most flash butt-welding applications can be consistently obtained. This apparatus eliminates the use of several diverse mechanisms previously required for this purpose. Both linear and non-linear flashing motions and control of weld upset are readily obtained. My apparatus in addition permits non-welding platen motions for work gauge clearance, guage takeup or work annealing.

INVENTOR
Paul M. Lowy.
HIS ATTORNEYS

CONTROL ARRANGEMENT FOR FLASH WELDER AND THE LIKE

The present invention relates to control means including operating circuitry for a flash welder or the like, and more particularly to control means of the character described for imparting a predetermined but readily varied delineation of movement to the welding dies or platens of a flash butt-welder to permit a wide range of welding operations. Specifically, the invention relates to novel hydraulic apparatus for controlling the relative movements of the platens of the welder.

It will be understood in the art that the scope of material which may be welded or any given type of flash butt-welder or the like welding apparatus is dependent upon proper flashing and upset characteristics, electrical control and capacity, and proper clamping or fixturing. Flashing and upset characteristics are, of course, a reflection of a properly delineated movement of the platens. The most critical area of platen movement is the transistion adjacent the end of the flashing cycle and the beginning of the upset cycle of the welding operation.

As the need for joining an ever-widening range of alloys has grown (e.g., non-ferrous, exotic materials, and high temperature alloys) it has been found that the more critical the alloy, the more critical this transistion in the weld cycle becomes. Many of these alloys require very high, non-linear flashing rates with a smooth stepless transistion into a high speed upset; from an optimum standpoint this flashing rate follows a parabolic curve.

Basically, previous systems for automatically controlling the motions of the platens of flash butt-welders fall into one of the following categories:

1. Full mechanical cam drive—both flashing and upset;
2. Mechanical cam driven flashing control with separate upset means;
3. Pilot cam controlling flashing servomechanism with separate upset means;
4. Utilization of either flashing current or voltage to control a flashing servomechanism with separate upset means; and
5. Pneumatically operated machines utilizing a snubbing mechansim to control the platen during flashing.

Some of these systems are shown in the U.S. Pats. to Moore No. 2,647,980; Evans No. 2,877,337; Spire No. 2,404,620; Cooper No. 2,085,059; and Stieglitz No. 2,492,200. Of the cited patents, only Stieglitz No. 2,492,200 imposes a parabolic rate of motion upon the welding dies during flashing and upset. Stieglitz has illustrated the advantages of parabolic movement of the welding dies in certain welding die applications and his system is useful in a limited number of applications. The applicability of the Stieglitz apparatus is limited by its inability to deviate from a certain superimposed parabolic motion when required and its inapplicability to superimpose other motions to the welding dies without separate mechanical or hydraulic mechanisms. Typical of such superimposed motions are die gapping, gauge bar takeup, and two stage wide die spacing for work annealing and trimming.

My invention, through the use of a single integrated control mechanism together with associated actuating means overcomes these disadvantages of the prior art. I provide, therefore, a single control means capable of handling a great variety of resistance and flash welding applications, which in the past would have required several diverse control mechanisms. My welding control apparatus provides the aforementioned parabolic flashing curves coupled with high upset speeds, which are necessary for optimum welding of non-ferrous and the more exotic alloys. At the same time, my control mechanism can be varied to provide any type of either linear or non-linear flashing rate, together with any desired transistion rate into the upset portion of the welding cycle. Additional means are provided for controlling the maximum upset rate.

In a specific example of my integrated control mechanism utilizing a single servo valve, the valve incorporates a single spool for controlling all motions of the welding dies including not only the flashing and upset rates, but also auxiliary motions, such as die gapping and the other motions mentioned previously for specific applications. Use of this form of control apparatus offers the following major advantages:

1. Since the same valve spool controls both flashing and upset motions, the flashing rate, if desired, can be accelerated up to the full upset speed;
2. Since the fluid medium passes through the same valve spool during both flashing and upset the flow pattern is not disturbed during the transition from flashing to upset thus resulting in smoother and faster operation with none of the turbulence inherent in systems where the fluid is diverted through a separate valve during the upset portion of the weld cycle; and
3. During the flashing portion of the weld cycle the valve operates with a very small spool opening in order to maintain metering control. Characteristically, valves operated at such small orifices are sensitive to foreign particles in the fluid. However, since at upset the spool is opened to relatively wide opening and high flow rate it is thereby flushed clear each time the machine goes through its cycle.

By way of illustration our control apparatus can be employed with the flash welder described and claimed in a copending, co-assigned application of Charles M. Senn et al. entitled "Flash Strip Welder", filed October 21, 1966, Ser. No. 588,485. It will be understood, of course, that the disclosed control means apparatus can be employed with other forms of welding machinery wherein a similarly controlled movement of welding dies is desirable.

In the illustrated example of our welding control, the servo operated valve adjusts the amount of fluid feed to the movable die cylinder and thus controls the speed of the movable die. The rate of fluid feed is controlled by adjusting the size of an orifice in the fluid line and does not appreciably affect line pressure. Suitable sensing means are provided for adjusting the servo valve orifice to obtain the desired rate of flashing speed and platen position. The extent of adjustment is carefully related to the position of the welding dies throughout the welding cycle so that a smooth rate of speed change is effected. Accordingly, the usual abrupt change from the very low flashing speed to a very high upset speed is avoided, in contrast to many of the previously proposed welding controls. My control apparatus thus exhibits a high degree of sensitivity and the variation in the rate of die movement is stepless throughout the welding operation.

With my apparatus, consistently good welds can be formed without frequent adjustment of the welding apparatus. My control means, therefor, is especially advantageous when used with automatic welders particularly in those production lines where the weld must be made in a minimum of time.

I accomplish these desirable results by providing, in a control arrangement for controlling the movement of one member relative to a second member, the combination comprising means for moving said one member in a path toward and away from said second member, a single control mechanism having a movable actuator and coupling said moving means to said one member, first means coupled to said actuator for actuating said control mechanism during one portion of said path, second means coupled to said actuator for actuating said control mechanism in another portion of said path, and means coupled to at least one of said first and said second actuating means for superimposing a predetermined rate characteristic upon said one actuating means so that said one member can be moved in differing rates of speed in said path portions respectively and at a changing rate of speed in at least one of said path portions.

I also desirably provide a similar arrangement wherein said superimposing means and the associated actuating means move said control actuator at a slowly varying rate of speed corresponding to said one path portion, and said superimposing means and the associated actuating means move said control actuator at a rapidly varying rate corresponding to said second path portion, said slowly varying rate of movement blending smoothly into said rapidly varying rate of movement.

I also desirably provide a similar arrangement wherein overriding means are coupled generally in opposition to said superimposing means for imposing a different rate characteristic.

I also desirably provide a similar arrangement wherein said control mechanism is a single spool servo valve and said actuator includes a rod connected to said spool, a link member is pivotally connected to said rod, and said first and said second actuating means are coupled adjacent the ends respectively of said link member.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
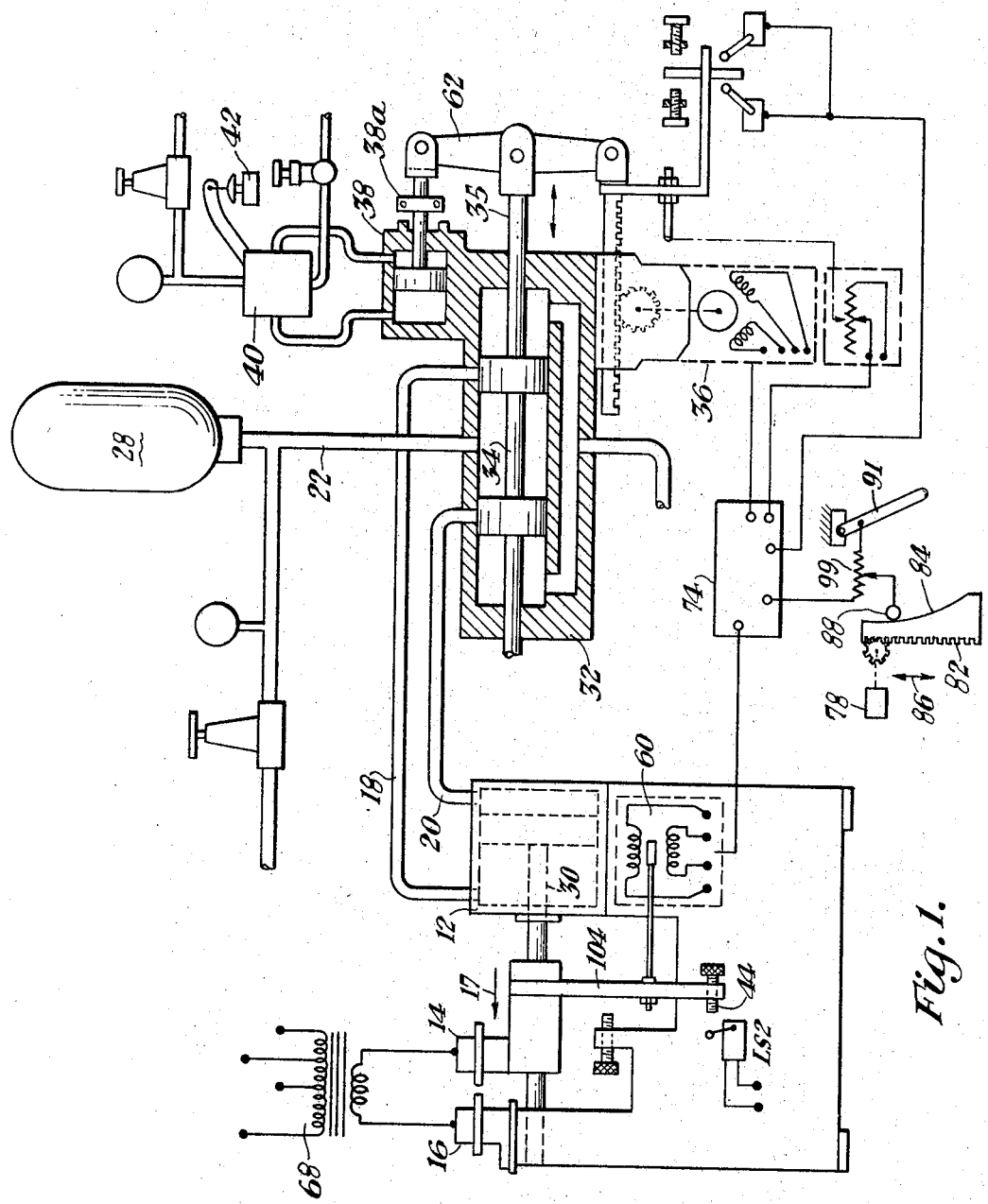
FIG. 1 is a schematic circuit diagram of an electro-hydraulic portion of our welding control means.

Referring now more particularly to the drawings, the exemplary arrangement of the invention shown therein provides means for controlling the rate of movement of hydraulic cylinder means 12 for moving welding dies 14 toward stationary welding dies 16, as denoted by arrows 17. The welding dies 14, 16, which are shown schematically in FIG. 1, can for example, take the form of the welding dies utilized in the flash welding apparatus of the aforementioned Senn et al. copending application.

Hydraulic or other suitable fluid is supplied and returned from the cylinder means 12 by means of conduits 18 and 20 respectively. Desirably, an accumulator tank 28, having a gas cushion such as nitrogen above one or more oil reservoirs therein, is connected to the supply pipe 22. The rate of movement of piston rod 30 of the cylinder 12 is controlled by the flow rate of the oil or other hydraulic fluid to the cylinder. The flow rate to and from the cylinders 12 is controlled by the movement of the spool 34 of the servo valve 32. Movements of the servo valve spool 34 are controlled by a linear servo actuator 36. Although specific materials, such as nitrogen and hydraulic oil have been mentioned, it will be clear that equivalent fluids can be substituted.

During the flashing portion of the welding cycle the supply of hydraulic fluid is controlled entirely by the servo valve 32 and the linear actuator 36 acting through spool rod 35 and pivoted link member 62. However, at the beginning of the upset portion of the cycle, i.e., near the end of the flashing cycle, the servo valve 32 is positioned for fast flow of hydraulic fluid to the cylinder 12 by means of the upset cylinder 38. The rate of upset flow is controlled by position of adjustable stop 38a which adjusts the stroke of upset cylinder 38 and movement of rod 35 and spool 34. The upset cylinder 38 is in turn controlled by upset solenoid valve 40 of conventional construction, and its solenoid 42 is actuated by means of limit switch LS2 when engaged by an adjustable actuator 44 on arm 104 coupled to the piston rod 30.

With the aforedescribed arrangement, the fast rate of hydraulic fluid flow to the welding die cylinder 12 is attained only during the upset portion of the welding cycle. This is occasioned by moving the upset actuating cylinder 38 to the preset on position just before the end of the welding cycle. The upset cylinder 38 cooperates with the servo actuator 36 to attain fast rate of weld die movement just before the end of the welding cycle, i.e., during the upset period. The actuating means 36, 38 are coupled adjacent the ends respectively of the pivoted link member 62.

I further provide in accordance with the invention, means for controlling the servo actuator 36 so that different rates of movement are applied to the piston rod 30 and die structure 14. The rate of movement of the servo actuator 36 is controlled in this example through servo amplifier 74 by a cam 84 having a parabloic camming surface 84. Equivalent linear actuating means or other non-linear means can be substituted for the cam 82. The cam is driven (arrow 86) by a variable speed motor 78, and cam follower 88 actuates transducer 99 to supply a control signal to servo controller 37. The aforementioned cam 82 and certain of the associated components are shown and described in greater detail below with reference to a modification of my control apparatus shown in FIG. 2.

An overriding signal similarly can be supplied by manual actuation of lever 95. This permits independent, manual operation of the cylinder 12 and die 14 for gapping work gauge clearance, gauge take-up work annealing, etc. Alternatively, the lever 91 can be driven (by suitable motive means, not shown) at a predetermined linear or non-linear rate, either in the same or opposite direction of cam follower movement, to change the character of the input signal to servo amplifier 74.

Operation of cam 82 results in a parabolic acceleration of the welder dies 14 during the finishing cycle. When the upset portion of the welding cycle is reached, the movement of the upset cylinder 38 results in an extension of the parabolic acceleration of the welder dies 14. Thus, the servo actuator 36 and the upset cylinder 38 acting through linkage 62 on servo valve spool 34 impose a smooth continuous opening of the ports of servo valve 32 and hence upon the movements of the movable welding dies 14.

As noted above the aforementioned acceleration desirably conforms to a parabolic curve for welding applications such as described herein. One arrangement for imparting a parabolic function to the rectilinear movement of the servo actuator armature 60 is shown in detail in FIG. 2 of the drawings. In the acceleration circuit of FIG. 2, line voltage is supplied through conductors 66 to an auto-transformer 68 for cam motor 70 and to a conventional power supply 72 for servo amplifier 74. The servo amplifier in this example is Model No. 6510 obtained from Jordan Controls, Inc., located at Milwaukee, Wisconsin. The servo amplifier 74, which is coupled also in the conventional manner to line conductors 66, controls the energization of the servo actuator 36 (FIG. 1).

The cam motor 70, on the other hand, rotates cam drive 76 through gear unit 78. In this example, the cam drive operates through screw 80 to raise and lower cam 82 having a parabolic contour 84. In this example, the cam 82 moves vertically as denoted by arrow 86 and during the gap closing movement of the welding dies 14, is moved downwardly as viewed in FIG. 2.

Cooperating with the parabolic cam 82 is a cam follower shown schematically at 88 and coupled through suitable mechanical linkage designated generally at 90 to the armature 92 of a conventional differential displacement transducer denoted generally by the reference character 94. The transducer 94 in this example is Model No. 7-DC-DT-1000 available from the Transducer Division of the Sanborn Company, Waltham, Massachusetts. In this example, the "stator" of the transducer 94 is movably mounted for linear movement under control of manual operating lever 96 acting through suitable mechanical linkage designated generally at 98. The lever 96 can be actuated as indicated to provide manual control or adjustment of the welding die movements, when desired for the aforementioned purposes.

The transducer 94 is coupled in series to a similar transducer 100 suitably mounted upon the welding apparatus such that its armature 102 is moved by corresponding movements of the cylinder piston rod 30 through suitable mechanical linkage 104.

With this arrangement, the parabolic function of the cam 82 (or other suitable non-linear function) is imposed by the transducer 94 through the servo amplifier 74 upon the servo actuator motor 36 described above. At the same time, the parabolic acceleration of the servo actuator 36 is matched with the actual rate of travel of the dies 14 by means of the series-connected transducer 100 and by means of feed back potentiometer 106 coupled to the servo amplifier 74. The feed back potentiometer 106 is driven by the servo actuator 36 as denoted schematically by mechanical linkage 108.

In order to provide for permissible variations in width of the welding gap and in the amount of upset movement, the transducers 94, 100 are coupled in series parallel with potentiometers 110 and 112 and with trimmer potentiometer 114. The potentiometer 110 can be adjusted so that the control circuit accommodates a preselected width of welding gap. On the other hand, adjustment of the potentiometer 112 selects the amount of reverse motion of the movable die prior to the flashing cycle. Once made the adjustment of potentiometer 112 is no longer necessary regardless of area or composition of the material being welded. The adjustments of the potentiometer 110 will depend, of course, upon the composition and area of the material being welded.

At the completion of the welding cycle, cam 82 in its position denoted by the chain outline 116 thereof, actuates lower limit switch X1 which in turn energizes relay coil 118 to close relay contacts 120, 122 to reverse the cam motor 70 to return the cam 82 to its starting position during withdrawal movements of the welding dies 114. With the cam 82 thus returned, as denoted by its solid outlines in FIG. 2, another limit switch X2 is actuated to energize relay coil 124 and to close its contacts 126, 128 to return the cam motor 70 to its forward rotation.

Figure 2:
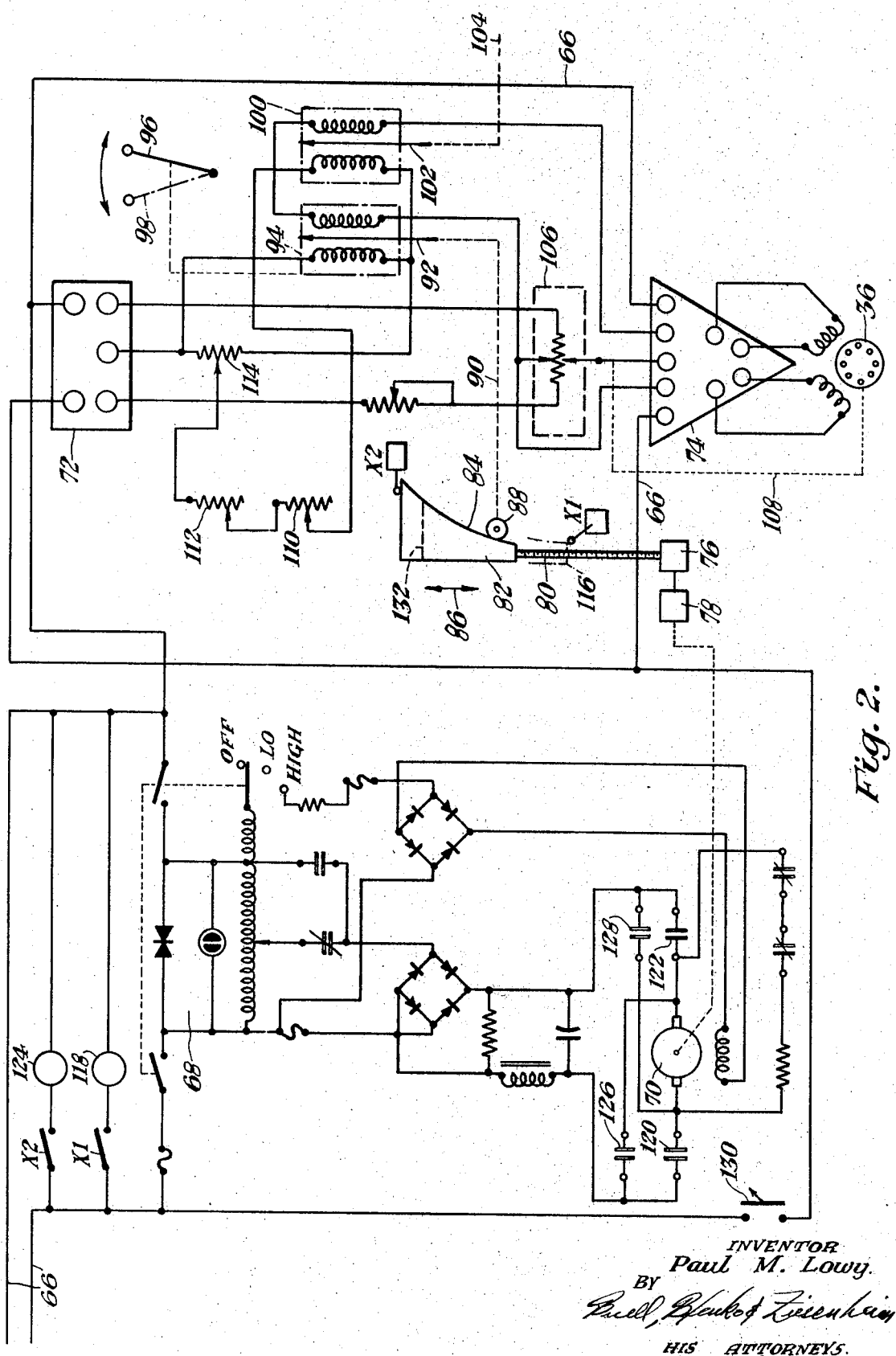
FIG. 2 is a schematic diagram of an electro-mechanical circuit forming part of my control means.

In operation of my control means, referring primarily to FIGS. 1 and 2 the servo actuator motor 36 is energized by closure of on-off switch 130 (FIG. 2). The servo actuator accelerates, in this example with a parabolic function, as determined by surface 84 of the cam 82. Acceleration of the servo actuator 36 is rather slow during the flashing portion of the welding cycle but commences to speed up substantially as the slope of the parabolic surface 84 changes rapidly in the area of the dashed horizontal line 132 (FIG. 2). As the cam 82 is displaced toward its bottommost position 116, the upset cylinder 38 is actuated by the upset valve 40—42 (FIG. 1). Movement of the upset cylinder 38 in conjunction with the servo actuator 36 achieves a maximum or almost infinite slope of the parabolic curve to produce a very fast rate of movement of the welding die 114 during the upset portion of the welding cycle.

As a result, the transition from movements of the centering valve 32 under the sole control of the linear servo actuator 36 to movements thereof under the joint control of the servo actuator 36 and the upset cylinder 38 is essentially stepless.

Figure 3:
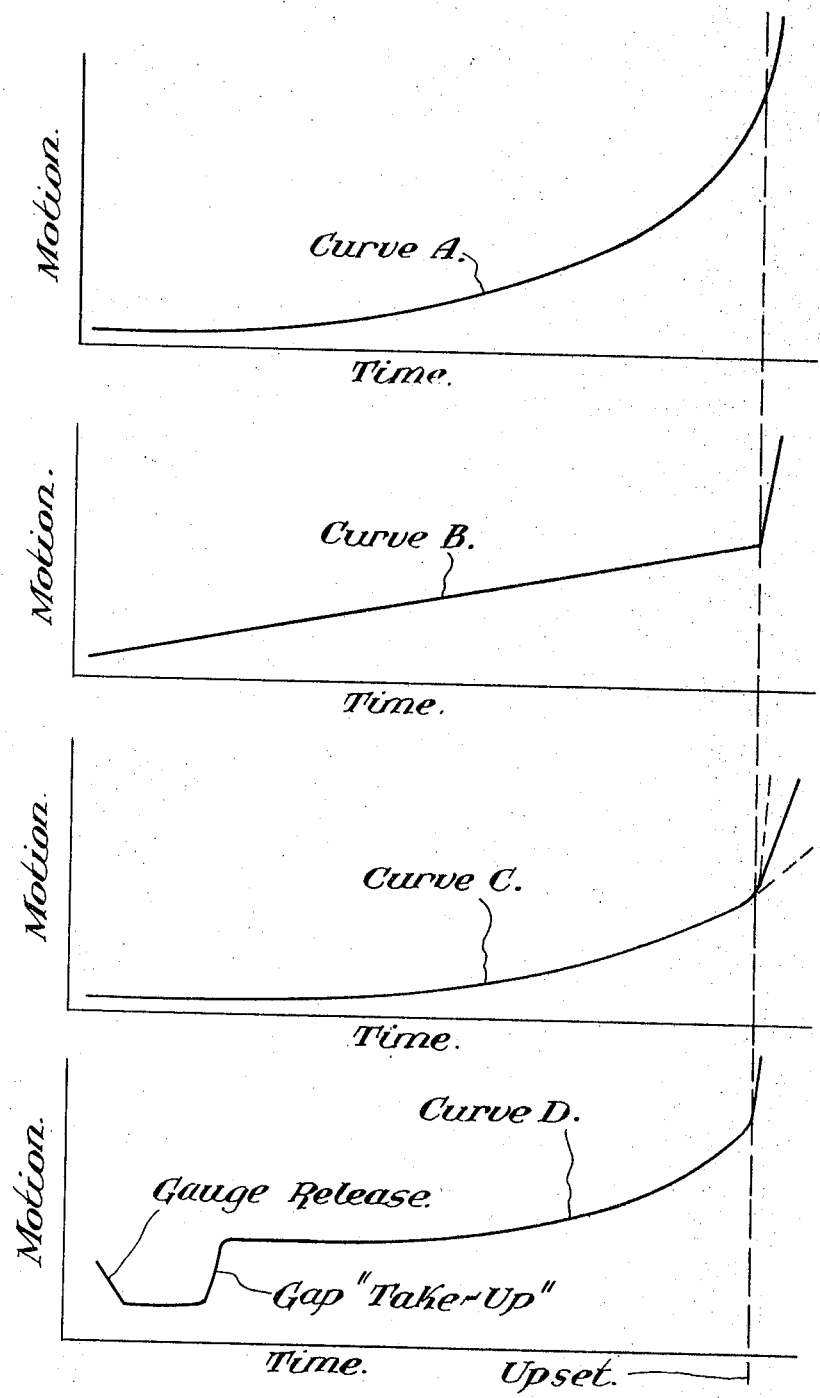
FIG. 3 is a graphical representation of selected operating characteristics of my novel control arrangement.

In FIG. 3, curve A illustrates a parabolic motion-time curve which can be obtained through use of the described control arrangement. As indicated by curves B and C, the motion-time curve is not limited to a parabolic curve but can be readily changed to any type of motion desired by similarly contouring the cam surface 84 or by concomitant operation of the lever 91 (FIG. 1). Curve D illustrates the reverse gauge release motion along with the gap take-up motion which can be imposed upon the dies 14 by operation of the servo control circuit for flash welding.

From the foregoing it will be apparent that novel and efficient forms of welding apparatus have been disclosed herein. While I have shown and described presently preferred embodiments of my invention and methods of practicing the same, it is to be distinctly understood that the invention is not limited thereto but may be otherwise variously embodied and practiced within the spirit and scope of the invention.

I claim:

1. In a control arrangement for controlling the movement of one member relative to a second member, the combination comprising means for moving said one member in a path toward and away from said second member, a single control mechanism coupled to said moving means and to said one member, said control mechanism having a moveable actuator therefor, first means coupled to said control mechanism actuator for actuating said control mechanism upon disposition of said one member in one portion of said path, second means coupled to said control mechanism upon disposition of said one member in another portion of said path, and means coupled to at least one of said first and said second actuating means for superimposing a pre-determined rate of movement characteristic upon said one actuating means so that said one member is moved at differing rates of speed in said path portions respectively and at a changing rate of speed in at least one of said path portions.

2. The combination according to claim 1 wherein said superimposing means is so coupled to the associated actuating means to move said control member actuator at a relatively slowly varying rate to effect corresponding movement of said one member in said one path portion, and said superimposing means and the associated actuating means are so coupled to said control mechanism actuator that said one member is moved at a relatively rapidly varying rate in said second path portion.

3. The combination according to claim 2 wherein said superimposing means and said associated actuating means are so coupled that said moving means moves said one member relative to said second member in accordance with a parabolic acceleration or deceleration rate.

4. The combination according to claim 1 wherein said superimposing means include an electro-mechanical transducer circuit actuated by a cam having a surface corresponding to said acceleration or deceleration characteristic.

5. The combination according to claim 4 wherein said superimposing means further include a servoactuator motor controlled by said transducer and said cam, and a feedback potentiometer is coupled to said motor for actuation thereby.

6. The combination according to claim 4 wherein said superimposing means further include a second electro-mechanical transducer mechanically coupled to said one member and electrically coupled to said first-mentioned transducer.

7. The combination according to claim 5 wherein overriding means opposable to said cam are coupled to said servoactuator motor for operating said motor.

8. The combination according to claim 1 wherein overriding means are coupled generally in opposition to said superimposing means for imposing a different rate characteristic.

9. The combination according to claim 1 wherein said control mechanism is a single spool servo valve and said actuator includes a rod connected to said spool, a link member is pivotally connected to said rod, and said first and said second actuating means are coupled adjacent the ends respectively of said link member.

10. The combination according to claim 2 wherein said superimposing means and said associated actuating means are so coupled that said moving means is capable of blending said slowly varying rate of movement of said one member smoothly into said rapidly varying rate of movement thereof.